United States Patent
Sugiyama et al.

(10) Patent No.: US 10,112,472 B2
(45) Date of Patent: Oct. 30, 2018

(54) DRIVE DEVICE FOR HYBRID VEHICLE

(71) Applicant: TOYOTA JIDOSHA KABUSHIKI KAISHA, Toyota-shi (JP)

(72) Inventors: Masataka Sugiyama, Toyota (JP); Ryuji Ibaraki, Miyoshi (JP); Hiroaki Kimura, Toyota (JP); Hiroki Kuwamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 214 days.

(21) Appl. No.: 15/108,125

(22) PCT Filed: Dec. 11, 2014

(86) PCT No.: PCT/IB2014/002738
§ 371 (c)(1),
(2) Date: Jun. 24, 2016

(87) PCT Pub. No.: WO2015/097510
PCT Pub. Date: Jul. 2, 2015

(65) Prior Publication Data
US 2016/0325613 A1    Nov. 10, 2016

(30) Foreign Application Priority Data

Dec. 26, 2013 (JP) ................................. 2013-269177

(51) Int. Cl.
*B60K 6/48* (2007.10)
*F16H 3/08* (2006.01)
(Continued)

(52) U.S. Cl.
CPC ............... *B60K 6/36* (2013.01); *B60K 6/40* (2013.01); *B60K 6/445* (2013.01); *F16H 3/728* (2013.01);
(Continued)

(58) Field of Classification Search
CPC ... B60K 6/48; B60K 2006/4825; F16H 3/089; F16H 59/02
(Continued)

(56) References Cited

U.S. PATENT DOCUMENTS

| 8,636,091 B2 * | 1/2014 | Sanji | B60K 6/26 |
| | | | 180/65.23 |
| 9,731,590 B2 * | 8/2017 | Sugiyama | B60K 6/40 |

(Continued)

FOREIGN PATENT DOCUMENTS

| JP | 61-130611 A | 6/1986 |
| JP | 2001-246953 A | 9/2001 |

(Continued)

OTHER PUBLICATIONS

International Search Report dated Apr. 13, 2015, in PCT/IB2014/002738 Filed Dec. 11, 2014.

*Primary Examiner* — Ha Dinh Ho
(74) *Attorney, Agent, or Firm* — Oblon, McClelland, Maier & Neustadt, L.L.P.

(57) ABSTRACT

An engine and a motor are arranged on different rotational axes. A driven gear shaft is arranged to rotate about the rotational axis shared with a rotor shaft of the motor. The driven gear shaft is connected to the rotor shaft of the motor for power transmission. The rotor shaft is rotatably supported by a first bearing. The rotor shaft and the driven gear shaft are formed of different shafts. The driven gear shaft is configured to extend in a shaft direction toward the rotor shaft side. A second bearing is arranged in an extended portion. The output shaft is arranged to rotate about the rotational axis shared with the rotor shaft of the motor. The output shaft is connected to the rotor shaft for power transmission. The output shaft is connected to a drive wheel for power transmission.

9 Claims, 5 Drawing Sheets

(51) Int. Cl.
  *B60K 6/36* (2007.10)
  *B60K 6/40* (2007.10)
  *B60K 6/445* (2007.10)
  *F16H 57/021* (2012.01)
  *F16H 3/72* (2006.01)
  *F16H 37/08* (2006.01)
  *F16H 57/02* (2012.01)

(52) U.S. Cl.
  CPC ........ *F16H 57/021* (2013.01); *B60Y 2200/92* (2013.01); *B60Y 2400/70* (2013.01); *F16H 2037/0873* (2013.01); *F16H 2057/02034* (2013.01); *F16H 2057/02043* (2013.01); *F16H 2200/2005* (2013.01); *F16H 2200/2064* (2013.01); *Y02T 10/6239* (2013.01); *Y10S 903/909* (2013.01)

(58) Field of Classification Search
  USPC ................................... 74/661, 665 A, 665 B
  See application file for complete search history.

(56) References Cited

U.S. PATENT DOCUMENTS

| | | | |
|---|---|---|---|
| 9,849,772 B2* | 12/2017 | Takami | B60K 6/40 |
| 2001/0011612 A1 | 8/2001 | Takenaka et al. | |
| 2012/0227394 A1 | 9/2012 | Schweiher et al. | |
| 2015/0203104 A1* | 7/2015 | Haneda | B60K 6/445 701/22 |
| 2016/0311305 A1* | 10/2016 | Ichikawa | B60K 6/365 |
| 2016/0311306 A1* | 10/2016 | Sugiyama | B60K 6/40 |

FOREIGN PATENT DOCUMENTS

| | | |
|---|---|---|
| JP | 2006-341849 A | 12/2006 |
| JP | 2006-341849 A5 | 12/2006 |
| JP | 2012-17007 A | 1/2012 |
| JP | 2013-60161 A | 4/2013 |
| JP | 2013/87840 A | 5/2013 |
| WO | WO 2013/080311 A1 | 6/2013 |

* cited by examiner

DRIVE DEVICE FOR HYBRID VEHICLE

BACKGROUND OF THE INVENTION

1. Field of the Invention

The present invention relates to a drive device for a hybrid vehicle, and in particular to a structure of a drive device in which an engine and a motor are arranged on different rotational axes.

2. Description of Related Art

For a drive device for a hybrid vehicle that includes an engine and a motor, a structure has been suggested in which the engine and the motor are arranged on different rotational axes. For example, a drive device for a hybrid vehicle that is described in Japanese Patent Application Publication No. 2012-017007 (JP 2012-017007 A) or, Japanese Patent Application Publication No. 2006-341849 (JP 2006-341849 A) is such an example. Since the engine and the motor are arranged in the different rotational axes as described above, an axial length of the drive device can be reduced in comparison with a case where the engine and the motor are arranged on a common rotational axis. In the drive device for a hybrid vehicle that is illustrated in FIG. 5 in JP 2012-017007 A, a drive gear 54, which is provided on an outer periphery of an output member 14 of an electrical gear change section 18, meshes with a driven gear 56 via an idler gear 58. The idler gear 58 is fitted to a counter shaft 28 in a manner capable of relative rotation. This driven gear 56 is attached to a coupling shaft 22b, which is spline-fitted to a rotor shaft 22a of a second motor MG2. In addition, in a drive device for a hybrid vehicle that is illustrated in FIG. 6 in JP 2012-017007 A, in order to suppress rattling sound generated in a spline-fitted section between the rotor shaft 22a of the second motor MG2 and the coupling shaft 22b, the output member 14 of the electrical gear change section 18 and the rotor shaft 22a of the second motor MG2 are directly coupled by a chain or a sprocket.

Here, it is considered to apply the configuration of the drive device for a hybrid vehicle in FIG. 6, which suppresses the rattling sound, to the drive device for a hybrid vehicle in FIG. 5 in JP 2012-017007 A. In this way, a configuration in which the driven gear 56, to which power of the electrical gear change section 18 is transmitted, is coupled to the rotor shaft 22a of the second motor MG2 in a manner capable of transmitting the power and in which the rotor shaft 22a is further coupled to the coupling shaft 22b is considered. The above configuration is shown in a schematic view in FIG. 6 of the subject specification. With the configuration as shown in FIG. 6, a power transmission path, in which power of the engine is transmitted to an output gear 30a sequentially through the driven gear 56, the rotor shaft 22a, and the coupling shaft 22b, is formed. In addition, the rotor shaft 22a is connected in series on the power transmission path between the engine and drive wheels. Thus, the rattling sound, which is generated between the rotor shaft 22a and the coupling shaft 22b, is prevented.

SUMMARY OF THE INVENTION

When the drive device for a hybrid vehicle is configured as shown in FIG. 6, two types of the power, which are the power from the engine and the power from the second motor MG2, are transmitted to the rotor shaft 22a, and an absolute value of a load is increased. In addition, in the drive device for a hybrid vehicle in FIG. 6, the rotor shaft 22a is supported by one bearing on an output side of the second motor MG2. Accordingly, in order to increase supporting rigidity of the bearing in conjunction with the increased load, the size of the bearing needs to be increased. Furthermore, the power received from the electrical gear change section 18 generates a static load that acts in a direction to press the rotational shaft in one direction. Meanwhile, the power output from the second motor MG2 generates a rotational load that acts in a direction to rattle the rotor shaft 22a during the rotation thereof (in a direction to press in both directions). A design requirement imposed on the bearing, which receives such static load and rotational load of different properties, differs by the load. For this reason, it is difficult that one bearing ensures the supporting rigidity against these loads. Thus, it is considered to newly install a bearing that supports the power transmitted to the driven gear. However, as shown in FIG. 6, since the driven gear 56 is directly fitted to the rotor shaft 22a, and there is no space to install a bearing that supports the driven gear 56, it is difficult to install the bearing that supports the driven gear 56.

The present invention provides a structure of a drive device for a hybrid vehicle that can suppress rattling sound generated on a rotor shaft and ensure supporting rigidity of each rotational shaft, the drive device for a hybrid vehicle including an engine and a motor arranged on different rotational axes.

A first aspect of the present invention is a drive device for a hybrid vehicle. The hybrid vehicle includes an engine, a motor, the engine and the motor being arranged on different rotational axes, and a drive wheel. The drive device includes a driven gear shaft, a first bearing, a second bearing, a driven gear, and an output shaft. The driven gear shaft is arranged to rotate about the rotational axis shared with a rotor shaft of the motor. The driven gear shaft is connected to the rotor shaft of the motor in a manner capable of power transmission to the rotor shaft of the motor. The driven gear shaft is a different shaft from the rotor shaft. The driven gear shaft extends in a shaft direction toward the rotor shaft side. The first bearing configured to support the rotor shaft to allow rotation of the rotor shaft. The second bearing is arranged on the driven gear shaft. The second bearing is arranged in a portion on the rotor shaft side of the driven gear shaft. The driven gear is configured such that power from the engine is transmitted to the driven gear. The driven gear is provided on the driven gear shaft. The output shaft is arranged to be rotatable about the rotational axis shared with the rotor shaft of the motor. The output shaft is connected to the rotor shaft in a manner capable of power transmission to the rotor shaft. The output shaft is connected to the drive wheel in a manner capable of power transmission to the drive wheel.

According to the above aspect, the driven gear shaft is a different shaft from the rotor shaft, and extends in the shaft direction. The second bearing is arranged on the portion on the rotor shaft side of the driven gear shaft. Thus, the driven gear shaft can be supported by the second bearing. Therefore, supporting rigidity of the driven gear shaft can be secured. In addition, it is designed that the first bearing receives the power transmitted from the motor, for example. It is also designed that the second bearing receives the power transmitted from the engine. In this way, the first bearing and the second bearing can fulfill different roles.

In the above aspect, an inner diameter of the first bearing may be smaller than an outer diameter of the driven gear. A fitted section may be provided between the rotor shaft and the driven gear shaft, the fitted section may be configured to fit to the rotor shaft and the driven gear shaft in a manner incapable of relative rotation. According to the above aspect, since the driven gear shaft is connected to the rotor shaft via the fitted section, a structure in which the inner diameter of the first bearing is smaller than the outer diameter of the driven gear can be realized. In addition, since the driven gear shaft is supported by the second bearing, the supporting rigidity thereof is ensured. Noted that, in a case the rotor shaft and the driven gear shaft are integrally molded, for example, if the inner diameter of the first bearing is smaller than an outer diameter of a gear that is formed on the rotational shaft, the first bearing cannot be assembled after the assembly of the rotor shaft.

In the above aspect, a case as a non-rotational member may be provided. An outer wheel of the first bearing may be attached to the case in a stationary-fitted state or in a transition-fitted state. An inner wheel of the second bearing may be attached to the driven gear shaft in a stationary-fitted state or in a transition-fitted state. According to the above aspect, in consideration of a fact that a rotational load, which acts in a direction to rattle the rotor shaft of the motor during rotation thereof, is applied to the first bearing, the outer wheel of the first bearing is attached to the case in the stationary-fitted state or in the transition-fitted state on the basis of a fitting condition. Thus, the first bearing is designed to receive the load. Meanwhile, in consideration of a fact that a static load, which acts in a direction to press the rotational shaft in one direction, is applied to the second bearing, the inner wheel of the second bearing and the driven gear shaft are attached in the stationary-fitted state or in the transition-fitted state on the basis of the fitting condition. Thus, the second bearing is designed to receive the load.

In the above aspect, the output shaft may be a different shaft from the rotor shaft. The output shaft may be arranged on an inner peripheral side of the driven gear shaft. The second bearing may be arranged on an outer periphery of the driven gear shaft such that the driven gear shaft is rotatably supported. According to the above aspect, since the driven gear shaft is supported by the second bearing, the supporting rigidity of the driven gear shaft can be secured.

In the above aspect, a third bearing may be arranged between the inner periphery of the driven gear shaft and an outer periphery of the output shaft. According to the above aspect, since the output shaft is supported by the third bearing, supporting rigidity of the output shaft can be secured.

In the above aspect, the output shaft may be a different shaft from the rotor shaft. The driven gear shaft may be arranged on an inner peripheral side of the output shaft. The second bearing may be arranged between the inner periphery of the output shaft and an outer periphery of the driven gear shaft. According to the above aspect, since the second bearing is inserted between the inner periphery of the output shaft and the outer periphery of the driven gear shaft, the driven gear shaft is supported by the second bearing. Thus, the supporting rigidity of the driven gear shaft can be secured.

In the above aspect, a third bearing arranged on an outer periphery of the output shaft may be provided. The output shaft may rotatably be supported by the third bearing. According to the above aspect, since the output shaft is supported by the third bearing, the supporting rigidity of the output shaft can be secured.

In the above aspect, the third bearing may be configured to support the output shaft so as to rotate the output shaft. The output shaft may be a different shaft from the rotor shaft. The driven gear shaft may be arranged at one end of the rotor shaft. The output shaft may be arranged at another end of the rotor shaft. The driven gear shaft and the output shaft may be connected to transmit power between the driven gear shaft and the output shaft. The driven gear shaft may rotatably be supported by the second bearing. According to the above aspect, the driven gear shaft is supported by the second bearing, and the output shaft is supported by the third bearing. Thus, the supporting rigidity of the driven gear shaft and the output shaft can be secured.

In the above aspect, the second bearing and the third bearing may be arranged at a position where the second bearing and the third bearing at least partially overlap in a radial direction. According to the above aspect, since the second bearing and the third bearing at least partially overlap in the radial direction, supporting rigidity of the bearing, which is arranged on the inner peripheral side, is increased.

BRIEF DESCRIPTION OF THE DRAWINGS

Features, advantages, and technical and industrial significance of exemplary examples of the invention will be described below with reference to the accompanying drawings, in which like numerals denote like elements, and wherein.

DETAILED DESCRIPTION OF EMBODIMENTS

A detailed description will hereinafter be made on examples of the present invention with reference to the drawings. Noted that, in the following examples, the drawings are appropriately simplified or modified. Thus, a dimensional ratio, a shape, and the like of each component are not necessarily depicted precisely.

Figure 1:
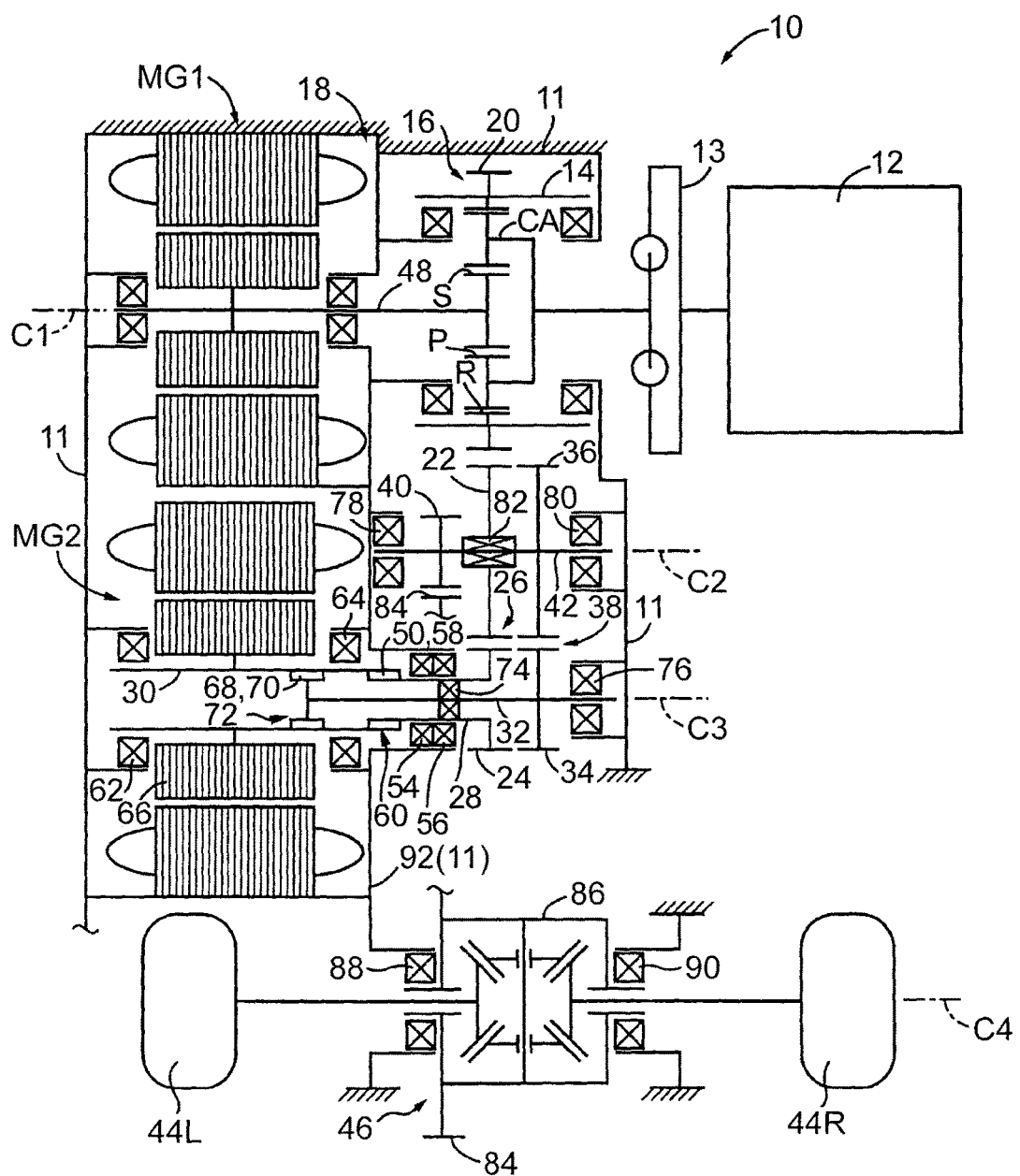
FIG. 1 is a schematic view of a configuration of a drive device for a hybrid vehicle that is an example of the present invention.

FIG. 1 is a schematic view of a configuration of a drive device 10 for a hybrid vehicle (hereinafter, a drive device 10) that is an example of the present invention. The drive device 10 is configured by including an engine 12 and a differential mechanism 16 in a case 11 as a non-rotational member. The engine 12 is a primary drive power source of a vehicle. The differential mechanism 16 splits power that is transmitted from the engine 12 via a damper device 13 to a first motor MG1 and an output member 14. The drive device 10 is configured by including: an electrical differential section 18, a second motor MG2, a speed increasing mechanism 26, a driven gear shaft 28, an output shaft 32, a speed reducing mechanism 38, a counter shaft 42, and a differential gear 46. The electrical differential section 18 controls a gear ratio when an operation state of the first motor MG1 thereof is controlled. The second motor MG2 is arranged on a different rotational axis from the first motor MG1 and functions as a secondary drive power source. The speed increasing mechanism 26 is configured by including an idler gear 22, which meshes with an output gear 20 formed in the output member 14, and a driven gear 24, which meshes with the idler gear 22. The driven gear shaft 28 is formed with the driven gear 24. The output shaft 32 is coupled to a rotor shaft 30 of the second motor MG2. The speed reducing mechanism 38 is configured by including an output gear 34, which is formed on the output shaft 32, and a large-diameter gear 36, which meshes with the output gear 34. The counter shaft 42 is formed with the large-diameter gear 36 and a small-diameter gear 40. The differential gear 46 receives the power from the small-diameter gear 40 and transmits the power to right and left drive wheels 44. Noted that the second motor MG2 is an example of the motor of the present invention.

This drive device 10 is preferably used for a hybrid vehicle of front-engine, front-wheel-drive (FF) type. In addition, the drive device 10 has four rotational axes C1, C2, C3, and C4. More specifically, the engine 12, the differential mechanism 16, and the first motor MG1 are arranged on the first rotational axis C1. The counter shaft 42, which is provided with the large-diameter gear 36, the idler gear 22, and the small-diameter gear 40, is arranged on the second rotational axis C2. The driven gear shaft 28, which is formed with the driven gear 24, the second motor MG2, and the output shaft 32, which is formed with the output gear 34, are arranged on the third rotational axis C3. The differential gear 46 is arranged on the fourth rotational axis C4. As described above, with respect to the engine 12, the first motor MG1, and the differential mechanism 16, the second motor MG2 is arranged on the different third rotational axis C3. Thus, an axial length of the drive device 10 is reduced.

The differential mechanism 16 functions as a power split device that splits the power, which is output from the engine 12, to the first motor MG1 and the output member 14. The differential mechanism 16 is formed of a planetary gear train of single pinion type that includes a sun gear S, a ring gear R, and a carrier CA. The sun gear S is coupled to a rotor shaft 48 of the first motor MG1. The ring gear R is provided in a coaxial manner with the sun gears S and integrally provided in an inner periphery of the cylindrical output member 14. The carrier CA supports a pinion gear P, which meshes with the sun gear S and the ring gear R, so as to allow revolution and rotation thereof.

Figure 6:
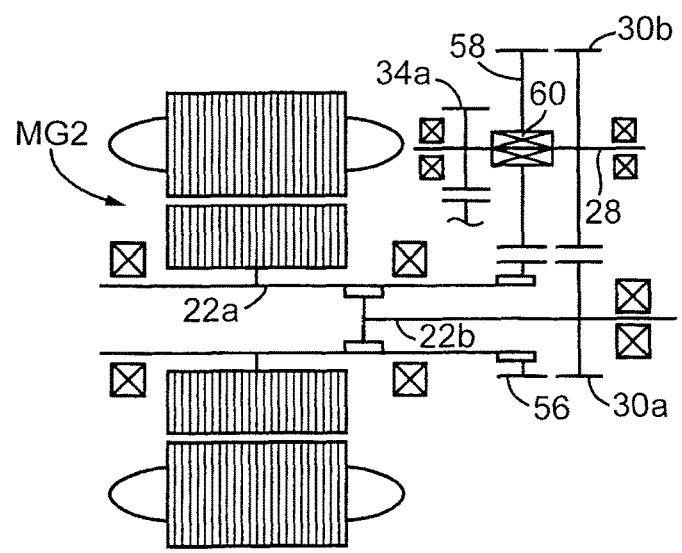
FIG. 6 is a schematic view of a configuration of a drive device for a hybrid vehicle that is suggested on the basis of a conventional technique.

In addition, the power that has been transmitted to the output member 14 is then transmitted to the driven gear 24, which is arranged on the third rotational axis C3, via the idler gear 22, which meshes with the output gear 20 formed on an outer periphery of the output member 14. This driven gear 24 is formed on the driven gear shaft 28. The driven gear shaft 28 is formed in a hollow cylindrical shape. The driven gear 24 is formed at a shaft end (the right side in the drawing) of the driven gear shaft 28. At another shaft end of the driven gear shaft 28 (the second motor MG2 side, the left side in the drawing), outer peripheral teeth 50 are formed. The outer peripheral teeth 50, are spline-fitted to inner peripheral teeth 58, which are formed on the rotor shaft 30. In addition, the driven gear shaft 28 extends in a shaft direction toward the rotor shaft 30, so as to ensure a distance between the driven gear 24 and the outer peripheral teeth 50 in the shaft direction. As described above, since the driven gear shaft 28 extends in the shaft direction, the distance between the driven gear 24 and the outer peripheral teeth 50 is increased, and a space is thereby provided between the driven gear 24 and the outer peripheral teeth 50. Due to provision of this space, a ball bearing 54 and a ball bearing 56 are arranged on an outer periphery of an extended portion of the driven gear shaft 28. The ball bearing 54 and the ball bearing 56 support the driven gear shaft 28 such that the driven gear shaft 28 rotates about the third rotational axis C3. In other words, since the driven gear shaft 28 extends in the shaft direction toward the rotor shaft side, the bearings 54, 56 can be arranged on the outer periphery of the driven gear shaft 28. Accordingly, the driven gear shaft 28 is supported in a cantilevered state by the bearings 54, 56. On the contrary, in the structure shown in FIG. 6, there is no space to arrange a bearing that supports a rotational shaft provided with a driven gear. Thus, it is difficult to arrange the bearings 54, 56 in FIG. 1. Noted that these ball bearing 54 and ball bearing 56 are an example of the second bearing of the present invention.

The driven gear shaft 28 is applied with a static load, which acts in a direction to press the driven gear shaft 28 in one direction by the power transmitted from the engine side. In order to receive this static load, which is applied to the driven gear shaft 28, and also to conform to a fitting condition (a design requirement) of the bearing, the ball bearing 54 and the ball bearing 56 are attached and fixed in a stationary-fitted state or a transition-fitted state since inner wheels of the ball bearing 54 and the ball bearing 56 are press-fitted to the driven gear shaft 28. Outer wheels of the ball bearing 54 and the ball bearing 56 are fitted to the case 11 in a clearance-fitted state. The stationary-fitted state is a fitted state in a case where minimum limit of size of the driven gear shaft is larger than maximum limit of size of the inner wheel of the bearing. The transition-fitted state is a fitted state where maximum limit of size of the driven gear shaft is larger than minimum limit of size of the inner wheel of the bearing and where the minimum limit of size of the driven gear shaft is smaller than the maximum limit of size of the inner wheel of the bearing. Noted that each of the ball bearing 54 and the ball bearing 56 is constituted as a double-row angular bearing, for example, in which the inner wheel and the outer wheel are formed of one member.

The outer peripheral teeth 50 of the driven gear shaft 28 are spline-fitted to the inner peripheral teeth 58, which is formed on one side (the engine side, the right side in the drawing) in a shaft direction of the rotor shaft 30. Accordingly, the driven gear shaft 28 and the rotor shaft 30 are connected to allow power transmission therebetween and integrally rotated. A fitting section 60 is formed by the outer peripheral teeth 50 of this driven gear shaft 28 and the inner peripheral teeth 58 of the rotor shaft 30. In the fitting section 60, the driven gear shaft 28 and the rotor shaft 30 are fitted to each other in a manner incapable of relative rotation.

The rotor shaft 30 is formed in a hollow cylindrical shape, and is supported by a ball bearing 62 and a ball bearing 64, which are arranged near both ends in the shaft direction thereof, so as to be rotatable about the third rotational axis C3. In addition, a rotor 66 of the second motor MG2 is fixed to an outer periphery of the rotor shaft 30 in a manner incapable of relative rotation. This rotor shaft 30 is applied with a rotational load, which acts in a direction to rattle the rotor shaft 30 during rotation thereof by the power output from the second motor MG2. In order to receive this rotational load, which is applied to the rotor shaft 30, and also to conform to the fitting condition (the design requirement) of the bearing, the ball bearing 62 and the ball bearing 64 are attached and fixed in a stationary-fitted state or a transition-fitted state since the outer wheels of the ball bearing 62 and the ball bearing 64 are press-fitted to the case 11. Inner wheels of the ball bearing 62 and the ball bearing 64 are fitted in a clearance-fitted state. The stationary-fitted state is a fitted state in a case where minimum limit of size of an outer wheel of the bearing is larger than maximum limit of size of the case. The transition-fitted state is a fitted state in a case where maximum limit of size of the outer wheel of the bearing is larger than minimum limit of size of the case and where the minimum limit of size of the outer wheel of the bearing is smaller than the maximum limit of size of the case. Inner peripheral teeth 68 are aligned with the inner peripheral teeth 58 and provided on an inner peripheral side of the rotor shaft 30. These inner peripheral teeth 68 are spline-fitted to outer peripheral teeth 70, which are provided at the one end (the second motor MG2 side, the left side in the drawing) in the shaft direction of the output shaft 32. A fitting section 72 is formed by the inner peripheral teeth 68 of this rotor shaft 30 and the outer peripheral teeth 70 of the output shaft 32. In the fitting section 72, the rotor shaft 30 and the output shaft 32 are fitted to each other in a manner incapable of relative rotation. Noted that the ball bearing 64 is an example of the first bearing of the present invention.

The output shaft 32 is arranged on the inner peripheral side of the driven gear shaft 28, and is supported by a needle bearing 74 and a ball bearing 76, so as to rotate about the third rotational axis C3. The needle bearing 74 is arranged in a gap between the outer periphery of the output shaft 32 and the inner periphery of the driven gear shaft 28. The needle bearing 74 is arranged at a position where the needle bearing 74 overlaps the ball bearing 54 and the ball bearing 56 in a radial direction when seen in the shaft direction. In this way, the needle bearing 74 supports the output shaft 32 via the case 11, the ball bearing 54 or the ball bearing 56, and the driven gear shaft 28, so as to allow rotation of the output shaft 32. The output gear 34 is provided on the output shaft 32 on the ball bearing 76 side in the shaft direction of the output shaft 32. This output gear 34 meshes with the large-diameter gear 36 that is formed on the counter shaft 42. Noted that the needle bearing 74 is an example of the third bearing of the present invention. In addition, instead of the needle bearing 74, a bush may be arranged as the third bearing.

Both ends of the counter shaft 42 are supported by a ball bearing 78 and a ball bearing 80 in a manner that the counter shaft 42 can rotate about the second rotational axis C2. In addition, the idler gear 22, which meshes with the output gear 20 of the electrical differential section 18 and the driven gear 24, is arranged on the counter shaft 42 in a manner capable of relative rotation with respect to the counter shaft 42 by a ball bearing 82. Furthermore, the counter shaft 42 is provided with the small-diameter gear 40, which meshes with a differential ring gear 84 of the differential gear 46, in a manner incapable of relative rotation with respect to the counter shaft 42.

A differential case 86 of the differential gear 46 is supported by a ball bearing 88 and a ball bearing 90 in a manner that the differential gear 46 can rotate about the fourth rotational axis C4. The differential gear 46 is configured by having a differential mechanism, and produces an appropriate rotational speed difference between the right and left drive wheels 44L, 44R during turning, for example. In this way, smooth turning of the wheels is realized. Noted that, since the differential gear 46 is known art, a detailed description on a structure and an operation thereof will not be made.

The drive device 10 is configured as described above. Accordingly, the power of the engine 12 is transmitted to the output gear 20 via the electrical differential section 18, and is further transmitted to the driven gear shaft 28 via the idler gear 22. The driven gear shaft 28 is spline-fitted to the rotor shaft 30 by the fitting section 60, and the rotor shaft 30 is spline-fitted to the output shaft 32 by the fitting section 72. Accordingly, the power that has been transmitted to the driven gear shaft 28 is transmitted to the output shaft 32 via the fitting section 60, the rotor shaft 30, and the fitting section 72. Then, the power that has been transmitted to the output shaft 32 is transmitted to the right and left drive wheels 44L, 44R via the large-diameter gear 36, the counter shaft 42, the small-diameter gear 40, the differential ring gear 84, and the differential gear 46. In addition, the power of the second motor MG2 is output from the rotor shaft 30, is transmitted to the output shaft 32 via the fitting section 72, and is then transmitted to the right and left drive wheels 44L, 44R via the large-diameter gear 36, the counter shaft 42, the small-diameter gear 40, the differential ring gear 84, and the differential gear 46. In addition, in the drive device 10, since inertia of the rotor 66 of the second motor MG2 is constantly connected to a power transmission path, the occurrence of the rattling sound is suppressed. Therefore, the engine 12 can be operated in an operation range that has not conventionally been used due to high likelihood of the occurrence of the rattling sound despite the fact that fuel efficiency of the engine 12 is high.

In this example, the rotor shaft 30 and the driven gear shaft 28 are formed as different shafts. Thus, an inner diameter of the inner wheel of the ball bearing 64, which supports the rotor shaft 30, can be set smaller than an outer diameter (outermost radius) of the driven gear 24, which is formed on the driven gear shaft 28. Upon assembly of the drive 10, components are sequentially assembled from the second motor MG2 side. Here, the rotor shaft 30 and the driven gear shaft 28 are formed as the different shafts. Accordingly, after a partition wall 92 of the case 11 is assembled in a state that the ball bearing 64 is assembled to the partition wall 92 in advance, the driven gear shaft 28 can be assembled. Thus, the inner diameter of the inner wheel of the ball bearing 64 can be set smaller than the outer diameter of the driven gear 24. In addition, the rotor shaft 30 and the output shaft 32 are formed as different shafts. Thus, an outer diameter of the output gear 34, which is provided on the output shaft 32, can be set larger than the inner diameter of the inner wheel of the ball bearing 64. Noted that, in a case where the rotor shaft 30 and the driven gear shaft 28 are integrally molded, for example, the partition wall 92 of the case 11, to which the ball bearing 64 is assembled in advance, cannot be assembled after this integrated member is assembled.

In addition, the rotor shaft 30 is supported independently by the ball bearing 62 and the ball bearing 64. The driven gear shaft 28 is supported independently by the ball bearing 54 and the ball bearing 56. The output shaft 32 is supported independently by the needle bearing 74 and the ball bearing 76. In this way, supporting rigidity of each of these rotational shafts can be secured. Meanwhile, the inner wheels of the ball bearings 54, 56 are press-fitted to the rotational shaft on the basis of the design requirement for the bearings such that the ball bearing 54 and the ball bearing 56 receive the static load, which acts in the direction to press the rotational shaft in the one direction by the power transmitted from the engine side. The outer wheels of the ball bearings 62, 64 are press-fitted to the rotor shaft 30 on the basis of the design requirement for the bearings such that the ball bearing 62 and the ball bearing 64 receive the rotational load, which acts in the direction to rattle the rotor shaft 30 by the power output from the second motor MG2 during the rotation of the rotor shaft 30. Therefore, these loads having different properties can be supported by the different bearings.

As described above, according to this example, the driven gear shaft 28 extends in the shaft direction toward the rotor shaft side, and the ball bearings 54, 56 are arranged on the outer periphery of the driven gear shaft 28. With such a configuration, the driven gear shaft 28 can be supported by the ball bearings 54, 56. Thus, the supporting rigidity of the driven gear shaft 28 can be secured. In addition, it is designed that the ball bearings 54, 56 receive the static load, which acts in the direction to press the rotational shaft in the one direction by the power transmitted from the engine side, for example. It is also designed that the ball bearing 64 receives the rotational load, which acts in the direction to rattle the rotor shaft 30 by the power output from the second motor MG2 during the rotation of the rotor shaft 30. Thus, the two loads having the different properties can be distributed and received by the bearing 64 and the bearings 54, 56.

In addition, according to this example, the driven gear shaft 28 and the output shaft 32 are formed as the different shafts from the rotor shaft 30. The fitting sections 60, 72 are respectively provided between the rotor shaft 30 and the driven gear shaft 28 and between the rotor shaft 30 and the output shaft 32. In the fitting section 60, the rotor shaft 30 and the driven gear shaft 28 are fitted to each other in the manner incapable of relative rotation. In the fitting section 72, the rotor shaft 30 and the output shaft 32 are fitted to each other in the manner incapable of relative rotation. Thus, the outer diameters of the driven gear 24 and the output gear 34 can be set larger than the inner diameter of the inner wheel of the ball bearing 64. Meanwhile, since the driven gear shaft 28, which is formed as the different shaft from the rotor shaft 30, is supported by the ball bearings 54, 56, the supporting rigidity thereof is secured.

Furthermore, according to this example, in consideration of the fact that the rotational load is applied to the ball bearing 64 during the rotation of the rotor shaft 30 of the second motor MG, the outer wheel of the ball bearing 64 is attached to the case 11 in the stationary-fitted state or in the transition-fitted state on the basis of the fitting condition (the design requirement). Thus, the ball bearing 64 can receive the load. Meanwhile, in consideration of the fact that the static load is applied to the ball bearings 54, 56, the inner wheels of the ball bearings 54, 56 are attached to the driven gear shaft 28 in the stationary-fitted state or in the transition-fitted state on the basis of the fitting condition (the design requirement). Thus, the ball bearings 54, 56 can receive the load.

Moreover, according to this example, the needle bearing 74 is arranged between the inner periphery of the driven gear shaft 28 and the outer periphery of the output shaft 32. Accordingly, the supporting rigidity of the output shaft 32 is secured by the needle bearing 74 and the ball bearing 76. Here, since the needle bearing 74 is arranged at the position where the needle bearing 74 overlaps the bearings 54, 56 in the radial direction when seen in the shaft direction, the supporting rigidity of the needle bearing 74 is increased.

Next, another example of the present invention will be described. Noted that components in the following description that are common with those in the above-described example are denoted by the same reference numerals, and the description thereof will not be made.

Figure 2:
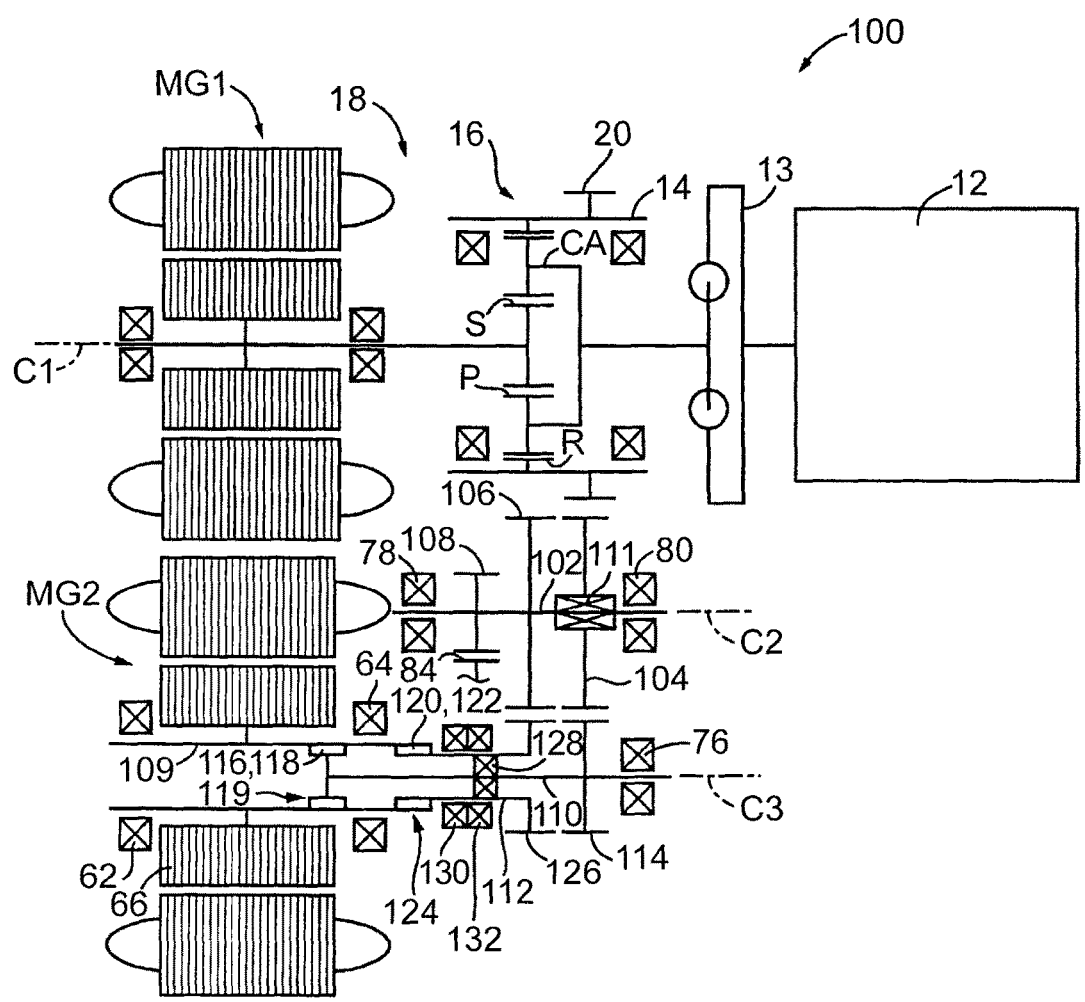
FIG. 2 is a schematic view of the configuration of the drive device for the hybrid vehicle that is another example of the present invention.

FIG. 2 is a schematic view of a configuration of a drive device 100 for a hybrid vehicle as another example of the present invention. Noted that, in FIG. 2, the differential gear 46, which is arranged around the fourth rotational axis C4, and the case 11 as the non-rotational member are not shown. When the drive device 100 is compared to the above-described drive device 10 in FIG. 1, a structure around the second rotational axis C2 and a structure around the third rotational axis C3 differ. More specifically, the driven gear shaft is arranged on the inner peripheral side of the output shaft. With such a configuration, a diameter of the output shaft is increased. Thus, the drive device 100 is suited for a system in which large torque is transmitted. The following description will be centered on differences in the structure of the drive device 100 from that of the drive device 10.

A counter shaft 102, which is rotatably supported by the ball bearing 78 and the ball bearing 80, is arranged on the second rotational axis C2. On the counter shaft 102, an idler gear 104, a large-diameter gear 106, and a small-diameter gear 108 are arranged in this order from the ball bearing 80 side to the ball bearing 78 side in a shaft direction of the counter shaft 102. Noted that, compared to the drive device 10 in FIG. 1, the arrangement of the idler gear 104 and the large-diameter gear 106 is reversed.

The idler gear 104 is supported by a bearing 111 in a manner capable of relative rotation with respect to the counter shaft 102, meshes with the output gear 20 of the electrical differential section 18, and also meshes with a driven gear 114, which will be described below. Accordingly, the power of the engine 12 that is output from the output gear 20 is transmitted to the driven gear 114 via the idler gear 104.

The large-diameter gear 106 is provided on the counter shaft 102 in a manner incapable of relative rotation with the counter shaft 102, and meshes with an output gear 126, which will be described below. In addition, the small-diameter gear 108 is provided on the counter shaft 102 in a manner incapable of relative rotation with the counter shaft 102, and meshes with a differential ring gear of a differential gear, which is not shown.

On the third rotational axis C3, a rotor shaft 109, a driven gear shaft 110, and an output shaft 112 are rotatably arranged. Here, in the drive device 100 of this example, the driven gear shaft 110 is arranged on an inner peripheral side of the output shaft 112.

The driven gear shaft 110 is rotatably supported by the ball bearing 76 and a needle bearing 128. The driven gear shaft 110 extends toward the rotor shaft side. The needle bearing 128 is arranged between the inner periphery of the output shaft 112 and an outer periphery of the driven gear shaft 110. Regarding the needle bearing 128, in order to conform to the fitting condition of the bearing, an inner wheel of the needle bearing 128 is attached to the driven gear shaft 110 in a stationary-fitted state or a transition-fitted state, and an outer wheel of the needle bearing 128 is fitted to the output shaft 112 in a clearance-fitted state. At an end on the ball bearing 76 side of the driven gear shaft 110 in a shaft direction of the driven gear shaft 110, the driven gear 114, which meshes with the idler gear 104, is provided. At an end on an opposite side from the ball bearing 76 of the driven gear shaft 110 in the shaft direction, outer peripheral teeth 118 are formed. The outer peripheral teeth 118 are spline-fitted to inner peripheral teeth 116, which are formed on an inner periphery of the rotor shaft 109. A fitted section 119 of the present invention is formed by these inner peripheral teeth 116 and outer peripheral teeth 118. Noted that the needle bearing 128 is an example of the second bearing of the present invention.

The rotor shaft 109 is rotatably supported by the ball bearing 62 and the ball bearing 64. Regarding these ball bearing 62 and ball bearing 64, the outer wheels of the ball bearing 62 and the ball bearing 64 are attached to the case (not shown in FIG. 2) in the stationary-fitted or transition-fitted state. The inner wheels of the ball bearing 62 and the ball bearing 64 are fitted in the clearance-fitted state. The rotor shaft 109 is formed with the inner peripheral teeth 116 and inner peripheral teeth 122. The inner peripheral teeth 116 are spline-fitted to the outer peripheral teeth 118 of the driven gear shaft 110. The inner peripheral teeth 122 are spline-fitted to outer peripheral teeth 120, which are formed on the output shaft 112. A fitted section 124 is formed by these outer peripheral teeth 120 and inner peripheral teeth 122.

The output shaft 112 has a cylindrical shape, and is supported in a cantilevered state by a ball bearing 130 and a ball bearing 132, so as to be rotatable about the third rotational axis C3. The output shaft 112 is formed with the outer peripheral teeth 120 at an end on the second motor MG2 side of the output shaft 112 in the shaft direction. At an end on an opposite side of the second motor MG of the output shaft 112 in the shaft direction, the output gear 126, which meshes with the large-diameter gear 106, is formed. Since the outer peripheral teeth 120 and the output gear 126 are separated from each other for a specified distance in the shaft direction, a space is formed on an outer periphery of the output shaft 112. The ball bearings 130, 132 are arranged on the outer periphery of the output shaft 112. Noted that the ball bearing 130 and the ball bearing 132 are an example of the third bearing of the present invention that is arranged on the outer periphery of the output shaft.

As described above, the driven gear shaft 110 extends in the shaft direction toward the rotor shaft side. The needle bearing 128 is arranged between the inner periphery of the output shaft 112 and the outer periphery of the driven gear shaft 110. Accordingly, even when the driven gear shaft 110 and the rotor shaft 109 are formed as different shafts, the driven gear shaft 110 is supported independently by the needle bearing 128 and the ball bearing 76. Thus, the supporting rigidity of the driven gear shaft 110 is secured. In addition, since the output shaft 112 is also supported independently by the ball bearing 130 and the ball bearing 132, the supporting rigidity of the output shaft 112 is secured. Noted that the needle bearing 128 is arranged between the inner periphery of the output shaft 112 and the outer periphery of the driven gear shaft 110, and is arranged at a position where the needle bearing 128 overlaps the ball bearing 130 or the ball bearing 132 in the radial direction when seen in the shaft direction. In this way, the supporting rigidity thereof is further increased.

In addition, the driven gear shaft 110 and the output shaft 112 are formed as the different shafts from the rotor shaft 109, and are respectively fitted to the rotor shaft 109 by the fitted sections 119, 124 in the manner incapable of relative rotation with the rotor shaft 109. Thus, outer diameters of the driven gear 114 and the output gear 126 can be set larger than the inner diameter of the inner wheel of the ball bearing 64.

As described above, according to this example, the driven gear shaft 110 extends in the shaft direction toward the rotor shaft side, and the needle bearing 128 is arranged between the inner periphery of the output shaft 112 and the outer periphery of the driven gear shaft 110. Thus, the driven gear shaft 110 is supported by the needle bearing 128 and the ball bearing 76, and the supporting rigidity of the driven gear shaft 110 can be secured.

In addition, according to this example, a structure in which an inner diameter of the ball bearing 64 is smaller than the outer diameter of the driven gear 114 can be realized when the driven gear shaft 110 is connected via the fitted section 119. Noted that the driven gear shaft 110 and the rotor shaft 109 are formed of the different shafts. However, since the driven gear shaft 110 is supported by the needle bearing 128 and the ball bearing 76, the supporting rigidity of the driven gear shaft 110 is secured.

Furthermore, according to this example, the ball bearing 130 and the ball bearing 132 are arranged on the outer periphery of the output shaft 112. Thus, the output shaft 112 is rotatably supported by these ball bearings 130, 132, and the supporting rigidity of the output shaft 112 is secured.

Figure 3:
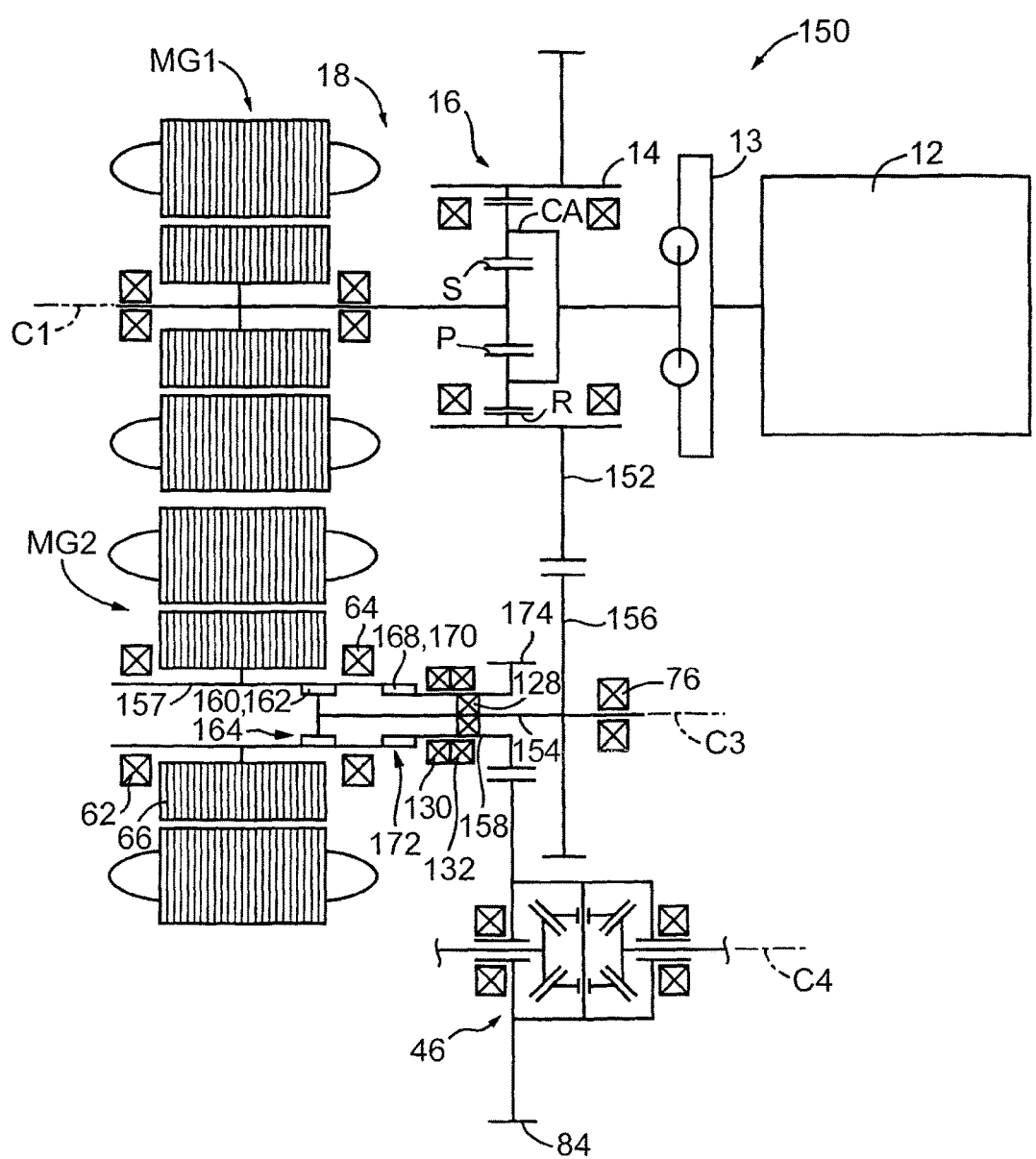
FIG. 3 is a schematic view of the configuration of the drive device for the hybrid vehicle that is yet another example of the present invention.

FIG. 3 is a schematic view of a configuration of a drive device 150 for a hybrid vehicle that is yet another example of the present invention. In the drive device 150 in FIG. 3, the counter shaft 42, which is arranged around the second rotational axis C2 in the drive device 10 in FIG. 1, is not shown. A description will hereinafter be made on a structure in which this counter shaft is not provided.

In the electrical differential section 18, which is arranged on the first rotational axis C1 of the drive device 150, an output gear 152, which is formed in the output member 14, is larger in a radial direction than the output gear 20 of the drive device 10 in FIG. 1. This output gear 152 meshes with a driven gear 156 of a driven gear shaft 154, which is arranged around the third rotational axis C3.

On the third rotational axis C3, the driven gear shaft 154, a rotor shaft 157, and an output shaft 158 are rotatably arranged. The driven gear shaft 154 extends in a shaft direction toward the rotor shaft side, and the needle bearing 128 is arranged between an inner periphery of the output shaft 158 and an outer periphery of the driven gear shaft 154. Regarding the needle bearing 128, in order to conform to the fitting condition of the bearing, an inner wheel of the needle bearing 128 is attached to the driven gear shaft 154 in a stationary-fitted or transition-fitted state, and the outer wheel of the needle bearing 128 is fitted to the output shaft 158 in a clearance-fitted state. In this way, the driven gear shaft 154 is rotatably supported by the needle bearing 128 and the ball bearing 76. At an end on the ball bearing 76 side of the driven gear shaft 154 in the shaft direction, the driven, gear 156, which meshes with the output gear 152, is formed. At an end on the opposite side from the ball bearing 76 of the driven gear shaft 154 in the shaft direction, outer peripheral teeth 162 are formed. The outer peripheral teeth 162 are spline-fitted to inner peripheral teeth 160, which are formed on an inner periphery of the rotor shaft 157. A fitted section 164 of the present invention is formed by these inner peripheral teeth 160 and outer peripheral teeth 162.

The rotor shaft 157 is supported by the ball bearing 62 and the ball bearing 64, so as to be rotatable about the third rotational axis C3. Regarding these ball bearing 62 and ball bearing 64, the outer wheels of the ball bearing 62 and the ball bearing 64 are attached to the case in the stationary-fitted or transition-fitted state, and the inner wheels of the ball bearing 62 and the ball bearing 64 are fitted in the clearance-fitted state. The rotor shaft 157 is formed with the inner peripheral teeth 160 and inner peripheral teeth 170. The inner peripheral teeth 160 are fitted to outer peripheral teeth 162 of the driven gear shaft 154. The inner peripheral teeth 170 are spline-fitted to outer peripheral teeth 168, which are formed on the output shaft 158. A fitted section 172 is formed by these outer peripheral teeth 168 and inner peripheral teeth 170.

The output shaft 158 is supported by the ball bearing 130 and the ball bearing 132 so as to be rotatable about the third rotational axis C3. At an end on the second motor MG2 side of the output shaft 158 in the shaft direction, the outer peripheral teeth 168 are formed. At an end on an opposite side from the second motor MG2 of the output shaft 158 in the shaft direction, an output gear 174, which meshes with the differential ring gear 84 of the differential gear 46 is formed. Since the outer peripheral teeth 168 and the output gear 174 on the output shaft 158 are separated from each other for a specified distance in the shaft direction, a space is formed on an outer periphery of the output shaft 158. On the outer periphery of the output shaft 158, the ball bearing 130 and the ball bearing 132 are arranged. In this way, the output shaft 158 can be supported independently by the ball bearing 130 and the ball bearing 132.

As described above, the driven gear shaft 154 extends in the shaft direction, and the needle bearing 128 is arranged between the inner periphery of the output shaft 158 and the outer periphery of the driven gear shaft 154. Accordingly, the driven gear shaft 154 is supported independently by the needle bearing 128 and the ball bearing 76. Thus, the supporting rigidity of the driven gear shaft 154 is secured. In addition, since the output shaft 158 is also supported independently by the ball bearing 130 and the ball bearing 132, the supporting rigidity of the output shaft 158 is secured. Meanwhile, since the counter shafts 42, 102, the idler gears 22, 104, and the like of the drive devices 10, 100 in FIG. 1 and FIG. 2 are not provided in the drive device 150, an increase in the number of parts is suppressed.

As described above, the same effects as those obtained by the above-described examples can be obtained by this example. In addition, since the counter shaft and the like, which are provided in the drive device 10, are not provided in the drive device 150, such an effect that the increase in the number of the parts is suppressed can be obtained.

Figure 4:
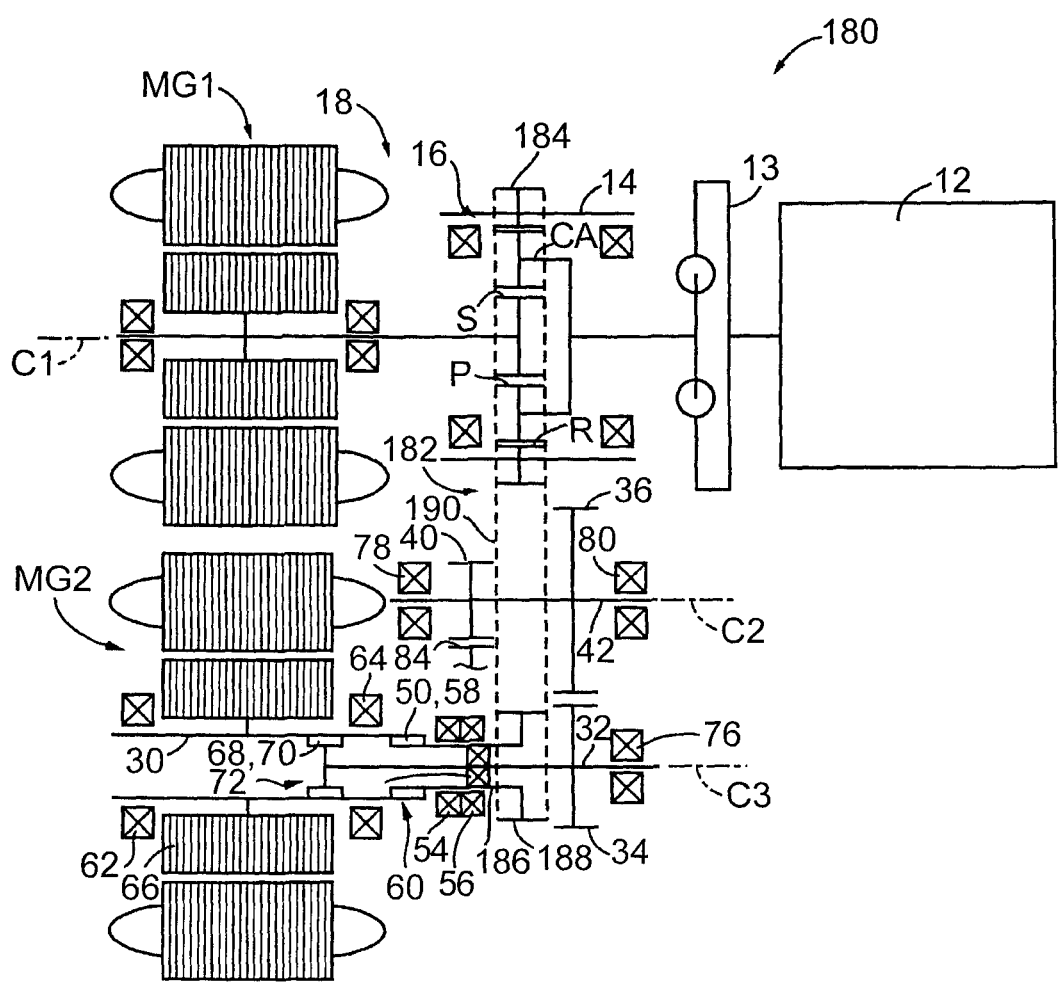
FIG. 4 is a schematic view of the configuration of the drive device for the hybrid vehicle that is further another example of the present invention.

FIG. 4 is a schematic view of a configuration of a drive device 180 for a hybrid vehicle that is further another example of the present invention. Noted that, also in FIG. 4, the differential gear 46 and the case 11, which are arranged around the fourth rotational axis C4, are not shown. In the drive device 180, the output member 14 of the electrical differential section 18 and the driven gear shaft are connected to allow power transmission therebetween by a chain mechanism 182, instead of the idler gear 22 in the drive device 10. Noted that, since the rest of the structure is the same as that of the above-described drive device 10, the description thereof will not be made.

The chain mechanism 182 is configured by including: a chain sprocket 184 that is fixedly provided in the output member 14 of the electrical differential section 18; a chain sprocket 188 that is fixedly provided in a driven gear shaft 186; and a chain 190 that is wound between the chain sprocket 184 and the chain sprocket 188. As described above, even in a case where the power is transmitted via the chain mechanism 182 instead of the idler gear, the same effect as that obtained by the drive device 10 in FIG. 1 can be obtained. In addition, the power is transmitted via the chain mechanism 182 in the drive device 180. Thus, compared to a case where the power is transmitted from the driven gear, which is usually formed of helical teeth (for example, the drive device 10), a load in the shaft direction (a thrust direction) is not applied to the driven gear shaft 186. Accordingly, the ball bearing 54 and the ball bearing 56, which support the driven gear shaft 186, are not applied with the load in the thrust direction, either. Thus, each of the ball bearing 54 and the ball bearing 56 can be changed to a roller bearing or the like. Noted that, in this example, the chain sprocket 188 fulfills a role as the driven gear of the present invention.

Also, in the drive device 180, since the driven gear shaft 186 extends toward the rotor shaft 30 of the second motor MG2, a space for arranging the bearings 54, 56 is secured on an outer periphery of the driven gear shaft 186. Then, the bearings 54, 56 are arranged in this space, and the driven gear shaft 186 is thereby supported in a cantilevered state by the ball bearings 54, 56. Meanwhile, the output shaft 32 is supported by the ball bearing 76 and the needle bearing 74. In this way, similar to the above-described examples, the supporting rigidity of each of the driven gear shaft 186 and the output shaft 32 is secured. In addition, similar to the above-described examples, it is designed that the ball bearing 64 receives the rotational load, and it is also designed that the ball bearings 54, 56 receive the static load. Accordingly, the static load and the rotational load having different properties from each other can be distributed and received by the ball bearings.

As described above, the same effects as those that can be obtained by the above-described examples can be obtained by this example. In addition, since the chain mechanism 182 is applied, the idler gear and the like need not be provided. Furthermore, since the thrust load is not applied to the driven gear shaft 186, the ball bearings 54, 56 can be changed to roller bearing or the like.

Figure 5:
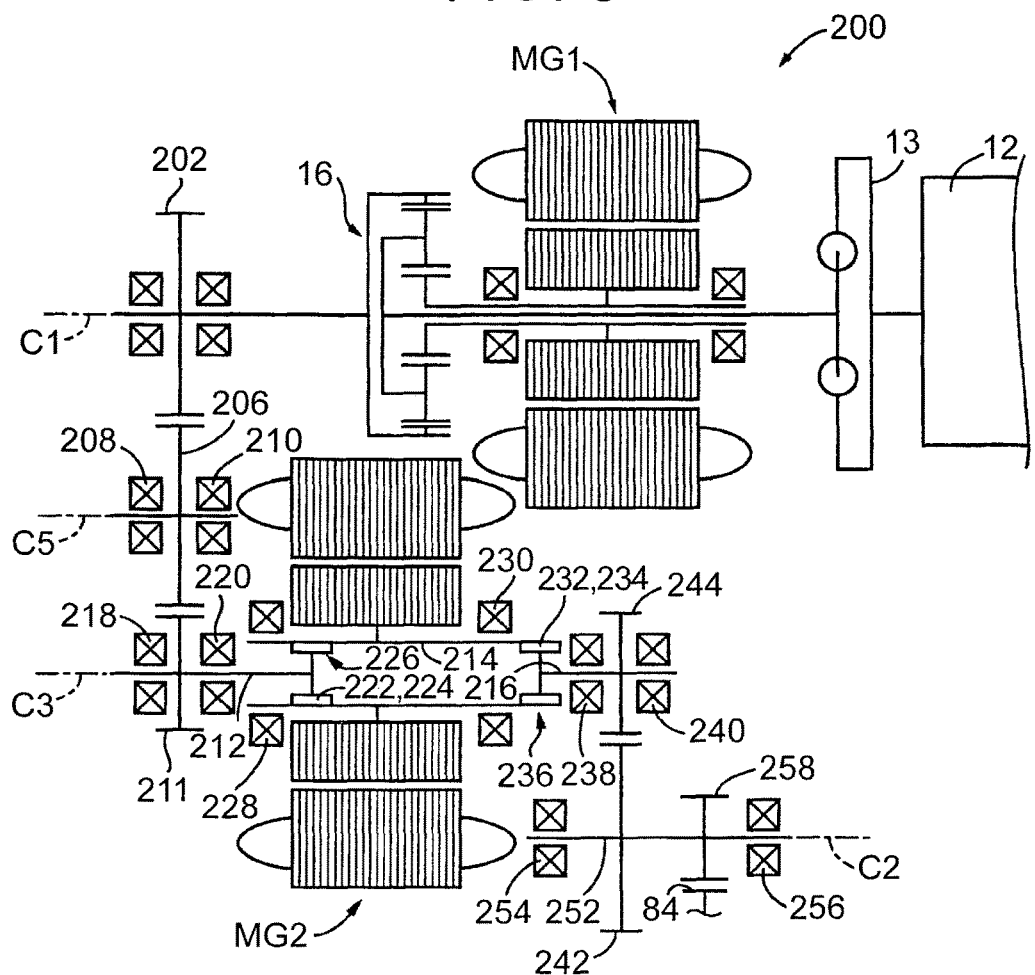
FIG. 5 is a schematic view of the configuration of the drive device for the hybrid vehicle that is further another example of the present invention.

FIG. 5 is a schematic view of a configuration of a drive device 200 for a hybrid vehicle that is further another example of the present invention. In the drive device 200, since the first motor MG1 and the second motor MG2 are arranged to partially overlap each other in a shaft direction, it is configured that a distance between a rotational axis of the first motor MG1 and a rotational axis of the second motor MG2 is set to be short.

On the first rotational axis C1, the damper device 13, the first motor MG1, the differential mechanism 16, and an output gear 202 are arranged in this order from the engine 12 side. The output gear 202 meshes with a middle gear 206, which is provided to be rotatable about a fifth rotational axis C5. The middle gear 206 is rotatably supported by a ball bearing 208 and a ball bearing 210. In addition, the middle gear 206 meshes with a driven gear 211, which can rotate about the third rotational axis C3.

On the third rotational axis C3, each of a driven gear shaft 212 that is formed with the driven gear 211, a rotor shaft 214 of the second motor MG2, and an output shaft 216 is arranged in a rotatable state. The driven gear shaft 212 is supported by a ball bearing 218 and a ball bearing 220, so as to be rotatable about the third rotational axis C3. At an outer peripheral end on the second motor MG2 side of the driven gear shaft 212 in a shaft direction, outer peripheral teeth 224 are formed. The outer peripheral teeth 224 are spline-fitted to inner peripheral teeth 222, which are formed on the rotor shaft 214. A fitted section 226 is formed by these inner peripheral teeth 222 and outer peripheral teeth 224. Here, the driven gear shaft 212 extends toward the rotor shaft 214 side in the shaft direction. Since the driven gear shaft 212 extends in the shaft direction as described above, a space is formed on an outer periphery of the driven gear shaft 212. Then, the ball bearing 220 is arranged in this space. As a result, the driven gear shaft 212 can be supported by the ball bearing 218 and the ball bearing 220, and thus the supporting rigidity of the driven gear shaft can be secured. Noted that, instead of the ball bearing 218 and the ball bearing 220, for example, a double-row angular bearing or the like can be used to support the driven gear shaft 212 in a cantilevered state. Noted that the ball bearing 220 is an example of the second bearing of the present invention.

The rotor shaft 214 is rotatably supported at both ends by a ball bearing 228 and a ball bearing 230. In addition, inner peripheral teeth are formed at both ends in a shaft direction of the rotor shaft 214 in the second motor MG2 of this example. More specifically, on the ball bearing 228 side of the rotor shaft 214 in the shaft direction (one end of the rotor shaft 214), the inner peripheral teeth 222, which mesh with the outer peripheral teeth 224 of the driven gear shaft 212, are formed. On the ball bearing 230 side in the shaft direction of the rotor shaft 214 (another end of the rotor shaft 214), inner peripheral teeth 234, which mesh with outer peripheral teeth 232, are formed. The outer peripheral teeth 232 are formed on the output shaft 216. A fitted section 236 is formed by these outer peripheral teeth 232 and inner peripheral teeth 234. As described above, the fitted section 226 and the fitted section 236 are provided at both ends of the rotor shaft 214. Thus, the driven gear shaft 212, the rotor shaft 214, and the output shaft 216 are arranged in series. Noted that each of the ball bearing 228 and the ball bearing 230 is one example of the first bearing of the present invention.

The output shaft 216 is rotatably supported by a ball bearing 238 and a ball bearing 240. At one end in a shaft direction of the output shaft 216, the outer peripheral teeth 232 are formed, and an output gear 244 is also formed. The output gear 244 meshes with a large-diameter gear 242, which is arranged on the second rotational axis C2. Here, the output shaft 216 extends in the shaft direction toward the rotor shaft side. Since the output shaft 216 is formed to extend in the shaft direction toward the rotor shaft side, a space is formed on an outer periphery of the output shaft 216, and the ball bearing 238 is arranged in this space. As a result, since the output shaft 216 can be supported by the ball bearing 238 and the ball bearing 240, the supporting rigidity of the output shaft 216 is secured. Noted that, instead of the ball bearing 238 and the ball bearing 240, for example, a double-row angular bearing or the like can be used to support the output shaft 216 in a cantilevered state. The ball bearing 238 is an example of the third bearing of the present invention.

The output gear 244 meshes with the large-diameter gear 242. The large-diameter gear 242 is provided on a counter shaft 252, which is arranged on the second rotational axis. C2, in a manner incapable of relative rotation. The counter shaft 252 is rotatably supported by a ball bearing 254 and a ball bearing 256. In addition, the counter shaft 252 is formed with a small-diameter gear 258, which meshes with the differential ring gear 84 of a differential gear.

In the drive device 200 configured as above, the power of the engine 12 is transmitted to the output gear 202, and further transmitted to the driven gear 211 via the middle gear 206. Here, the driven gear shaft 212 is connected to the rotor shaft 214 in series via the fitted section 226, and the rotor shaft 214 is connected to the output shaft 216 in series via the fitted section 236. Thus, the power that has been transmitted to the driven gear 211 is transmitted to the output shaft 216 via the driven gear shaft 212, the fitted section 226, the rotor shaft 214, and the fitted section 236. Then, the power that has been transmitted to the output shaft 216 is transmitted to the right and left drive wheels via the large-diameter gear 242, the small-diameter gear 258, the differential gear, and the like.

In the drive device 200, since the driven gear shaft 212 extends in the shaft direction, the ball bearing 220 can be arranged on the outer periphery of the driven gear shaft 212. As a result, the driven gear shaft 212 is supported by the ball bearing 218 and the ball bearing 220, and thus the supporting rigidity of the driven gear shaft 212 is secured. Meanwhile, since the output shaft 216 extends in the shaft direction, the ball bearing 238 can be arranged on the outer periphery of the output shaft 216. As a result, the output shaft 216 is supported by the ball bearing 238 and the ball bearing 240, and thus the supporting rigidity of the output shaft 216 is secured. Furthermore, it is designed that the ball bearing 218 and the ball bearing 220 receive the static load, which is applied thereto by the power transmitted from the engine 12. It is also designed that the ball bearing 238 and the ball bearing 240 receive the rotational load, which is applied thereto by the power output from the second motor MG2. Thus, the loads having the different properties can be distributed to the ball bearings. Moreover, since the first motor MG1 and the second motor MG2 partially overlap in the shaft direction, the first motor MG1 and the second motor MG2 can be compact in the radial direction.

As described above, the same effects as those obtained by the above-described examples can be obtained by this example. In addition, in the drive device 200, the driven gear shaft 212 and the output shaft 216 extend toward the rotor shaft side. The driven gear shaft 212 is rotatably supported by the ball bearings 218, 220. The output shaft 216 is rotatably supported by the ball bearings 238, 240. Thus, the supporting rigidity of both of the driven gear shaft 212 and the output shaft 216 can be secured.

The examples of the present invention have been described so far in detail on the basis of the drawings. The present invention can also be applied to other aspects.

For example, the needle bearing 74, which functions as the third bearing in the above-example, may be changed to a bush.

For example, in the drive device 150 of the above-described example, instead of the power transmission by the output gear 152 and the driven gear 156, a chain mechanism may be used for the power transmission.

In the above-described example, the needle bearing 74 is arranged at the position where the needle bearing 74 overlaps the ball bearings 54, 56 in the radial direction. However, the needle bearing 74 may not necessarily be arranged at the position where the needle bearing 74 overlaps the ball bearings 54, 56 in the radial direction.

In the above-described example, the inner peripheral teeth are formed on the rotor shaft, and the outer peripheral teeth are formed on the driven gear shaft and the output shaft. However, the present invention is not limited thereto. For example, while the outer peripheral teeth are formed on the rotor shaft, the inner peripheral teeth may be formed on the driven gear shaft and the output shaft.

In the above-described example, each of the output shafts 32, 112, 158, 216 is formed as the different shaft from the rotor shaft. However, any of the output shafts need not be formed as the different shaft, but may be integrally molded.

Noted that what has been described above is merely one aspect. The present invention can be carried out in an aspect in which various modifications and changes are made thereto on the basis of knowledge of those skilled in the art.

The invention claimed is:

1. A drive device for a hybrid vehicle, the hybrid vehicle including an engine, a motor, the engine and the motor being arranged on different rotational axes, and a drive wheel, the drive device comprising:
   a driven gear shaft arranged to rotate about the rotational axis shared with a rotor shaft of the motor, the driven gear shaft being connected to the rotor shaft of the motor in a manner capable of power transmission to the rotor shaft of the motor, and the driven gear shaft extending in a shaft direction toward a rotor shaft side;
   a first bearing configured to support the rotor shaft to allow rotation of the rotor shaft;

a second bearing arranged on the driven gear shaft, the second bearing being arranged in a portion on the rotor shaft side of the driven gear shaft;

a driven gear configured such that power from the engine is transmitted to the driven gear, the driven gear being provided on the driven gear shaft; and an output shaft arranged to be rotatable about the rotational axis shared with the rotor shaft of the motor, the output shaft being connected to the rotor shaft in a manner capable of power transmission to the rotor shaft, and the output shaft being connected to the drive wheel in a manner capable of power transmission to the drive wheel, wherein the rotor shaft, the driven gear shaft, and the output shaft are different shafts from each other, and the power from the engine is transmitted through the driven gear shaft, the rotor shaft, and the output shaft to the drive wheel.

2. The drive device according to claim 1, wherein
an inner diameter of the first bearing is smaller than an outer diameter of the driven gear, and
a fitted section is provided between the rotor shaft and the driven gear shaft, the fitted section is configured to fit to the rotor shaft and the driven gear shaft in a manner incapable of relative rotation.

3. The drive device according to claim 1, further comprising:
a case being a non-rotational member, an outer wheel of the first bearing being attached to the case in a stationary-fitted state or in a transition-fitted state, wherein
an inner wheel of the second bearing is attached to the driven gear shaft in the stationary-fitted state or in the transition-fitted state.

4. The drive device according to claim 1, wherein
the output shaft is arranged on an inner peripheral side of the driven gear shaft, and the second bearing is arranged on an outer periphery of the driven gear shaft such that the driven gear shaft is rotatably supported.

5. The drive device according to claim 4, further comprising:
a third bearing arranged between the inner periphery of the driven gear shaft and an outer periphery of the output shaft.

6. The drive device according to claim 1, wherein
the driven gear shaft is arranged on an inner peripheral side of the output shaft, and the second bearing is arranged between the inner periphery of the output shaft and an outer periphery of the driven gear shaft.

7. The drive device according to claim 6, further comprising:
a third bearing arranged on an outer periphery of the output shaft, the output shaft being rotatably supported by the third bearing.

8. The drive device according to claim 1, further comprising:
a third bearing configured to support the output shaft so as to rotate the output shaft, wherein
the driven gear shaft is arranged at one end of the rotor shaft, the output shaft is arranged at another end of the rotor shaft, the driven gear shaft and the output shaft are connected to transmit power between the driven gear shaft and the output shaft, and the driven gear shaft is rotatably supported by the second bearing.

9. The drive device according to claim 5, wherein
the second bearing and the third bearing are arranged at a position where the second bearing and the third bearing at least partially overlap in a radial direction.

* * * * *